K. FUKUDA.
NON-PNEUMATIC RUBBER BALL AND PROCESS OF MANUFACTURING THE SAME.
APPLICATION FILED MAR. 21, 1921.
Reissued May 24, 1921. 15,108.
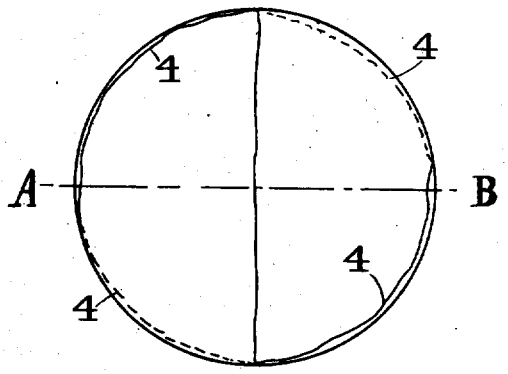
Fig. I
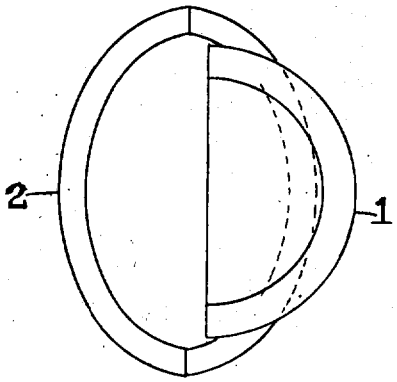
Fig. III
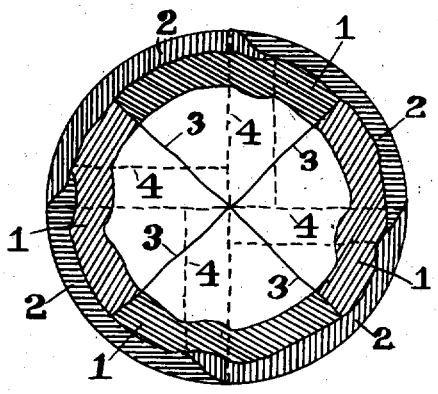
Fig. II
Inventor
Kinsuke Fukuda
by Connolly Bros.
Attorneys

UNITED STATES PATENT OFFICE.

KINSUKE FUKUDA, OF TOKYO, JAPAN.

NON-PNEUMATIC RUBBER BALL AND PROCESS OF MANUFACTURING THE SAME.

15,108. Specification of Reissued Letters Patent. Reissued May 24, 1921.

Original No. 1,320,221, dated October 28, 1919, Serial No. 277,708, filed February 18, 1919. Application for reissue filed March 21, 1921. Serial No. 454,229.

*To all whom it may concern:*

Be it known that I, KINSUKE FUKUDA, a subject of the Emperor of Japan, residing at No. 3394 Oimachi, Iharagun, Tokyo, Japan, have invented certain new and useful Improvements in Non-Pneumatic Rubber Balls and Processes of Manufacturing the Same, of which the following is a specification, reference being had therein to the accompanying drawing.

This invention relates to non-pneumatic rubber balls and to the process of manufacturing the same, the ball being constructed of double layers or shells, the outer layer or shell being made of ordinary or compact rubber and the inner layer or shell of spongy rubber.

The invention consists:

1st. In the provision of a non-pneumatic rubber ball composed of inner and outer layers or shells, the inner layer or shell consisting of spongy rubber and the outer layer or shell consisting of ordinary or compact rubber.

2nd. In the process of manufacturing the ball as hereinafter described.

In carrying the process in its preferred form into practice, the inner layer or shell is first made of a plurality of segments of the raw material of spongy rubber.

The inner layer or shell is next covered by a layer or shell made of a plurality of segments of the raw material of the ordinary or compact rubber and preferably in such a way that the seams of the inner and outer layers or shells do not coincide with each other.

The double ball thus made is lastly heated in a mold to convert the raw materials into the condition required for a completed ball.

The accompanying drawing shows a rubber ball made by this process and in the preferred form, in which;

Figure 1, is a surface view of a ball made according to my invention.

Fig. 2, is a sectional view on the line A—B of Fig. 1.

Fig. 3 is a fragmentary view in perspective showing the relative position of the segments of the inner and outer layers or shells.

In the drawing 1, designates a quadrantal segment of the inner layer or shell. The inner layer or shell is completed by four pieces of such quadrantal segments 1, which are made of the raw material to be converted into spongy rubber by heating.

The inner ball thus made is covered or coated by four pieces of the quadrantal segments 2 of the outer ball which is made of the raw material of the ordinary rubber.

If it is desired to produce a ball which may be used although some seams are opened, care must be taken to not coincide the seams 3 of the inner ball with the seams 4 of the outer ball.

The double ball made of the above mentioned two layers consisting of the raw materials of ordinary rubber and spongy rubber is heated suitably in a mold. Thereby the raw materials are converted respectively into the ordinary rubber and spongy rubber, thus the finished ball consists of a double layer, one of the ordinary rubber and the other of spongy rubber.

The ball manufactured by this process has a high elasticity and retains its spherical form without any pneumaticity. Also there is no danger of loss of elasticity by a penetration.

I claim:

1. Process of manufacture of non-pneumatic rubber ball, characterized by making firstly an inner ball of four quadrantal segments made of the raw material of the spongy rubber, secondly in covering the inner ball by four quadrantal segments of the outer ball made of the raw material of the ordinary rubber, not coinciding the seams with each other and thirdly by heating suitably the double ball thus made in a mold, so as to convert the outer ball into the ordinary rubber and the inner ball into the spongy rubber, substantially as set forth.

2. As a new article of manufacture, a rubber ball composed of two spherical shells each composed of a plurality of segments, the seams of the inner shell being non-coincident with the seams of the outer shell, the inner shell being of spongy rubber and the outer shell being of compact rubber.

3. As a new article of manufacture, a rubber ball composed of two shells or layers, one inclosing the other and each composed of several quadrantal segments, the seams of the inner shell being non-coincident with the seams of the outer shell, said inner shell being of spongy rubber and said outer shell of compact rubber.

4. As a new article of manufacture, a rubber ball consisting of two spherical shells, each composed of a plurality of segments, the inner shell being of spongy rubber and the outer shell being of compact rubber.

5. As a new article of manufacture, a rubber ball consisting of two separately formed, distinct shells or layers, one inclosing the other, and in surface contact therewith, one shell or layer being of spongy rubber and the other shell or layer being of compact rubber.

KINSUKE FUKUDA.